(12) United States Patent
Godwin et al.

(10) Patent No.: US 11,748,699 B2
(45) Date of Patent: Sep. 5, 2023

(54) PACKAGE RECEIVING AND DELIVERY SYSTEM

(71) Applicant: Box Bot Inc., Oakland, CA (US)

(72) Inventors: Mark Godwin, El Cerrito, CA (US); Austin Oehlerking, Oakland, CA (US); John McDonald, Oakland, CA (US)

(73) Assignee: BOX BOT, INC., Oakland, CA (US)

( * ) Notice: Subject to any disclaimer, the term of this patent is extended or adjusted under 35 U.S.C. 154(b) by 806 days.

(21) Appl. No.: 16/758,387

(22) PCT Filed: Nov. 5, 2018

(86) PCT No.: PCT/US2018/059119
§ 371 (c)(1),
(2) Date: Apr. 22, 2020

(87) PCT Pub. No.: WO2019/090196
PCT Pub. Date: May 9, 2019

(65) Prior Publication Data
US 2020/0342392 A1 Oct. 29, 2020

Related U.S. Application Data

(60) Provisional application No. 62/581,561, filed on Nov. 3, 2017.

(51) Int. Cl.
*B65G 1/04* (2006.01)
*G06Q 10/087* (2023.01)
*B65G 1/137* (2006.01)

(52) U.S. Cl.
CPC ......... *G06Q 10/087* (2013.01); *B65G 1/0407* (2013.01); *B65G 1/1378* (2013.01); *B65G 2201/025* (2013.01); *B65G 2209/06* (2013.01)

(58) Field of Classification Search
CPC ............................ B65G 1/0407; B65G 1/0485
See application file for complete search history.

(56) References Cited

U.S. PATENT DOCUMENTS 5,409,342 A * 4/1995 Galli .................... B65G 1/1371
414/21
6,325,586 B1 * 12/2001 Loy ...................... B65G 1/0414
414/281

(Continued)

*Primary Examiner* — Jonathan Snelting
(74) *Attorney, Agent, or Firm* — Brad Bertoglio; Intelink Law Group, P.C.

(57) ABSTRACT

An automated package Pickup and Receiving Station (PRS) (100) with autonomous ground vehicles (AGV) (18) are presented, which may be used to pick up, deliver and securely store packages (28), parcels, mail, prepared food, groceries or other items that may be placed in a tray, which may include an integrated container. A portal (10) facilitates loading of items into, and removal of items from, the PRS (100). Within the PRS (100), items (28) may be transported from source to destination on standardized trays (25), via a two-dimensional gantry (32) and an end of arm tool (22). The gantry (32) may be oriented for movement through a central corridor (21) in the PRS (100), with end of arm tool (22) adapted for pushing trays towards, or pulling trays from, either side of the gantry (32). Items may be stored on a tray (25) in internal shelving (20), or placed directly into an AGV (18), on either side of the PRS (100).

20 Claims, 18 Drawing Sheets

(56) References Cited

U.S. PATENT DOCUMENTS

| | | | |
|---|---|---|---|
| 2005/0047895 A1* | 3/2005 | Lert ..................... | B65G 1/1378 |
| | | | 414/273 |
| 2009/0162173 A1* | 6/2009 | Garbers .............. | B65G 1/0485 |
| | | | 414/331.14 |
| 2010/0300041 A1* | 12/2010 | Kim ..................... | G07F 11/165 |
| | | | 74/89.17 |
| 2016/0221768 A1* | 8/2016 | Kadaba ................. | G05B 19/19 |

* cited by examiner

PACKAGE RECEIVING AND DELIVERY SYSTEM

RELATED APPLICATIONS AND CLAIM OF PRIORITY

This patent application claims priority to U.S. provisional patent application 62/581,561, titled "Package Receiving and Delivery System", which was filed on Nov. 3, 2017.

TECHNICAL FIELD

The present disclosure relates in general to an automated package Pickup and Receiving Station (PRS) which may be used in combination with autonomous ground vehicles (AGV) to pick up, deliver and securely store parcels for the parcel delivery industry.

BACKGROUND

With the continued growth of Internet-based commerce, parcel delivery has become an increasingly prevalent means of conveying goods to businesses and individuals alike. However, growing parcel volumes present challenges for parcel transporters. Shippers become increasingly reliant on parcel shipping as a mode of product distribution. Parcel recipients may have to deal with increasing parcel volume, as well as increased instances of returning parcels via return shipment. Meanwhile, "last mile" delivery logistics are commonly understood to represent a significant portion of the cost and burden of parcel transport.

Various approaches have been attempted for improving the logistics of parcel delivery. For example, Amazon™ has introduced a locker service via which parcels may be delivered to a secure locker at a fixed site in the vicinity of the parcel recipient's address. The parcel recipient may then visit the locker site at the recipient's convenience, to enter a pickup code, or scan a bar code, in order to obtain access to a locker containing the recipient's parcel. However, such an approach requires the parcel recipient to travel to a locker site, which may be unavailable or inconvenient for many parcel recipients.

For these and other reasons, parcel shippers, carriers and recipients alike may benefit greatly from opportunities to reduce the cost of delivery, increase the speed and efficiency of delivery, and/or provide parcel shipping participants with greater convenience and flexibility.

SUMMARY

An automated and stationery package Pickup and Receiving Station (PRS) and autonomous ground vehicles (AGVs) may be utilized to pick up, securely store and deliver items such as packages, parcels, mail, prepared food, groceries, or other items that may be placed in a tray, which may include an integrated container. The station may include a two-dimensional gantry oriented along a central corridor. The gantry may support an end of arm tool for selectively engaging and disengaging from one or more package support trays. The end of arm tool may move the package support trays between a central position (e.g. in which the gantry may move the tray through the central corridor), a first extended position extended perpendicularly outwards from the 2D gantry in a first direction, and a second extended position extending perpendicularly outwards from the 2D gantry in a second direction. The tray may include a flat platform, guide rails, and/or integrated containers.

An access portal may allow individuals, such as a delivery service driver or consumer, to dispense one or more packages into the PRS. The portal may include a computer interface for, e.g., authenticating an individual using the portal and/or identifying a package being retrieved from or dispensed into the PRS. A portal door may be provided. A portal tray support may support a movable package support tray proximate a lower edge of the portal to facilitate dispensing of a package onto the tray by a user. The portal tray support may include a weigh scale to evaluate package weight. The portal may be positioned proximate the gantry, such that the end of arm tool may position a tray beneath the portal to receive a package. A tray and associated package may be moved by the end of arm tool and gantry from the portal, to storage shelving within the PRS, and/or into an AGV. The PRS may include one or more bays for passage of an AGV into the PRS. When within the PRS, an AGV may be positioned proximate the gantry to facilitate automated loading and unloading of trays and packages or other items supported thereon or therein.

In some embodiments, the end of arm tool may include pinion gears driven to engage and disengage with gear racks on the package support trays. In some embodiments, the end of arm tool may include friction rollers driven to engage with package support trays and pull the package support trays onto the end of arm tool, or push the package support trays into stationary PRS shelving or AGV package compartment shelving.

The PRS may include bays providing for navigation of AGVs into and out of the PRS. While housed within the PRS between operating periods, an AGV may recharge integrated batteries. An AGV may include a drive train portion for autonomous navigation of the AGV, as well as a package storage compartment. The package storage compartment may include a first side for automated loading of the AGV by, e.g., the PRS. The package storage compartment may include a second side for interaction of humans (e.g. package recipients, or individuals tendering a package to an AGV). The second side may include an array of access doors. The package storage compartment may be implemented without vertical separation between areas behind two or more adjacent access doors. Thus, package support trays may be dynamically positioned within the AGV package storage area such that packages may take up two or more adjacent storage areas. Upon delivery, the AGV may operate to identify two or more package storage areas associated with a package, and open two or more doors associated with those storage areas, thereby providing user access to a storage area appropriately sized for a package.

Customers can add or remove packages from an array of lockers on the AGVs after their identity is securely verified. Packages picked up from customers by the AGVs are returned to the PRS and unloaded with the automated 2D gantry and transferred to shelves inside the PRS for secure storage until they are picked up by delivery drivers.

Various other objects, features, aspects, and advantages of the present invention and embodiments will become more apparent from the following detailed description of preferred embodiments, along with the accompanying drawings in which like numerals represent like components.

DETAILED DESCRIPTION

Figure 1A:
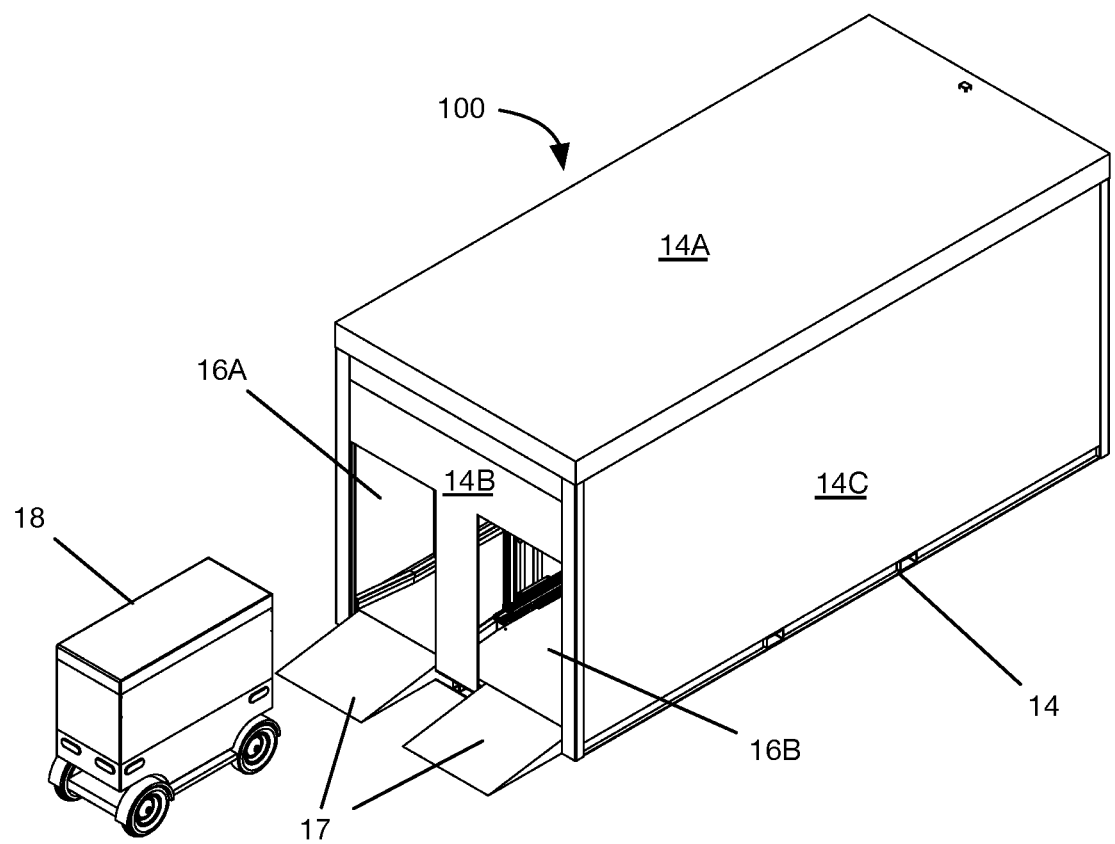
FIG. 1A is a right perspective view of a PRS with two AGV bays.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

A system for parcel delivery may be provided using a package Pickup and Receiving Stations (PRS). In some applications, it may be desirable to provide a number of PRSs located in areas having a high volume of local package delivery. Parcels directed to a recipient within an area serviced by the PRS may be delivered in bulk to the PRS by a parcel carrier. The PRS may then attend to final delivery to each parcel's recipient, preferably using an automated ground vehicle (AGV). Additionally or alternatively, consumers may access the PRS via a portal in order to retrieve packages stored in the PRS, or consumers may tender packages to an AGV for, e.g., subsequent retrieval by a package carrier for further transport.

While certain embodiments and illustrations described herein refer to handling and delivery of parcels and/or packages (which terms may be used interchangeably), it is contemplated and understood that various embodiments and inventions described herein may be beneficially utilized in connection with a wide variety of items, particularly items that may be placed in standardized trays or containers for handling. Examples include, without limitation: mail, parcels, packages, prepared foods, groceries, or other items that may be placed in trays or containers. Systems and methods referenced herein as handling parcels or packages should not be deemed limited to handling of such items, unless exclusion of other item types is expressly stated or inherent given the nature of the described method or apparatus.

In accordance with one exemplary embodiment, FIG. 1A illustrates a right perspective view of a PRS 100 with two AGV access bays 16, and with one AGV 18. The PRS 100 is housed within container 14, having top surface 14A, end surface 14B, side surface 14C, opposing side surface 14D and opposing end surface 14E. Preferably, for ease of installation, container 14 is constructed having a footprint approximately the maximum size that can be placed in a standard parking space and moved by a standard duty flatbed tow truck. Such an embodiment may then be readily transported and installed in, for example, a remote portion of a parking lot.

Figure 1B:
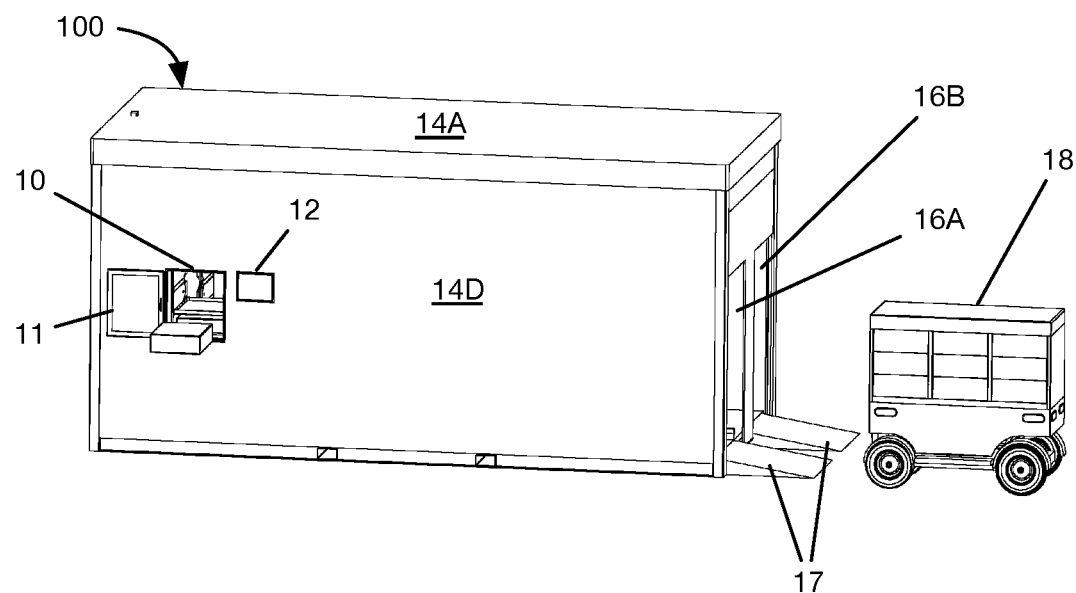
FIG. 1B is a left perspective view of a PRS with two AGV bays.
Figure 2:
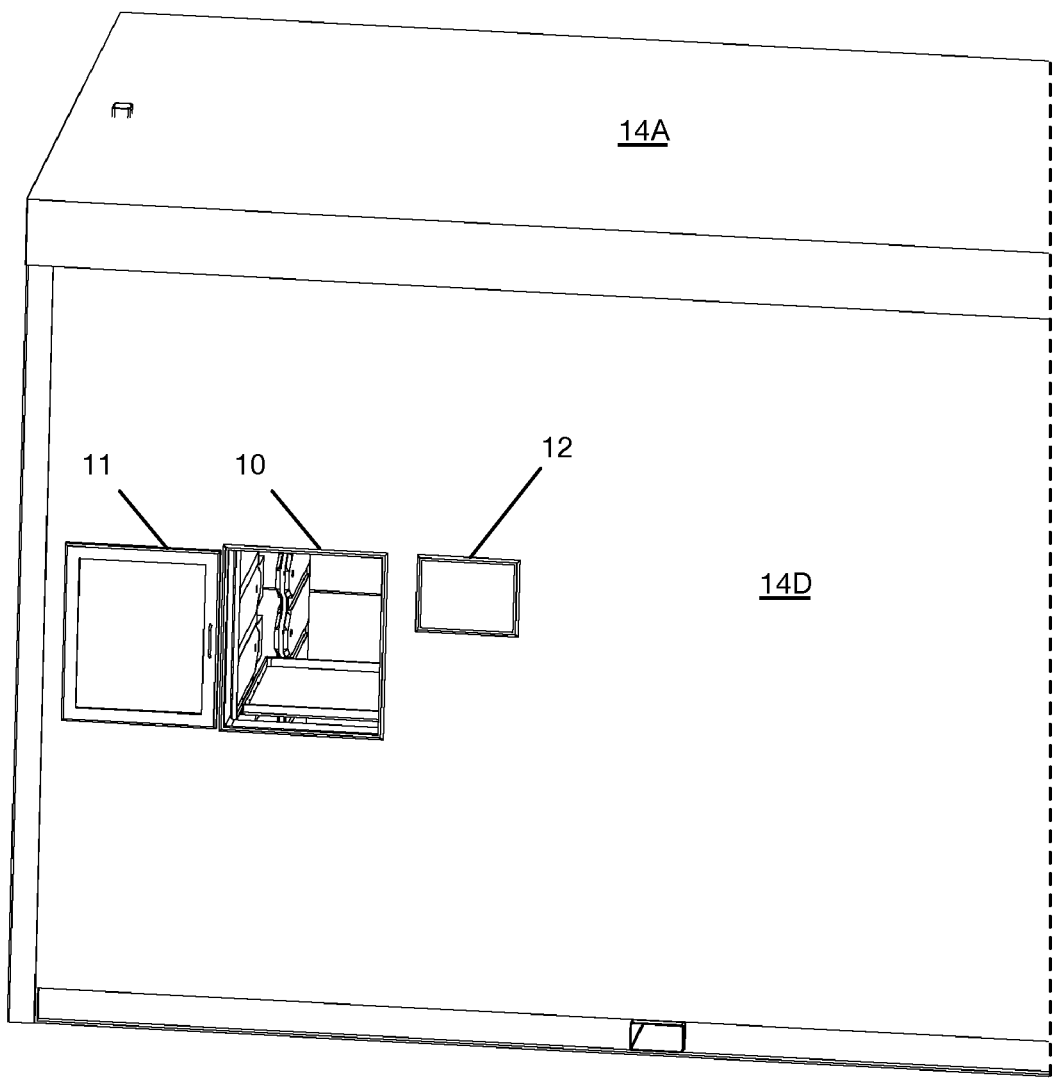
FIG. 2 is a close up perspective view of a portal for package insertion or retrieval.

FIG. 1B is right perspective view of PRS 100 with AGV 18, further illustrating package portal 10 set within PRS side 14D. FIG. 2 is a close up view of portal 10. Portal 10 is preferably set into a side surface of PRS 100, adjacent to end surfaces, one or more of which contain a bay for access by an AGV. As described further hereinbelow, portal 10 provides a mechanism for individuals, such as package delivery drivers, to load packages into, and/or remove packages from, PRS 100. Consumers may also access portal 10, e.g. in order to retrieve packages intended for them that are stored in the PRS, effectively using the PRS as a locker system. A computer interface 12 (preferably a touchscreen computer) is used to enable an individual to interact with the PRS 100. For example, a delivery service driver may utilize computer interface 12 to identify a package being deposited into PRS 100 via portal 10 (such as by scanning a bar code associated with a package or photographing the package using a camera integrated with computer interface 12). Additionally or alternatively, a delivery service driver or consumer package recipient may utilize computer interface 12 to specify a package to be retrieved from within PRS 100 and presented at portal 10 for removal by the requesting individual.

Thus, in the illustrated embodiment, two of the six sides of PRS 100 are used for entry and exit of AGVs 18 and entry and exit of the packages through the delivery driver portal 10. Using only two sides of the container 14 for access to PRS 100, preferably sides that are adjacent to one another, allows for PRS 100 to be installed in a greater variety of locations, such as a corner location in a parking lot, against a building, or in a corner formed by two walls.

AGV 18 is preferably an electrically-powered autonomous vehicle having internal package shelving, as described further below. PRS 100 may contain both a charging station and AGV alignment mechanism for each AGV bay 16. While not in operation, or while being loaded, AGV 18 can remained docked in one of bays 16 (e.g. left bay 16A or right bay 16B) for charging.

Mechanical alignment mechanisms, such as ramps 17 (which may include integrated guide rails for AGV tires) as well as internal tire end stops, may be used to ensure that shelving in the AGV is located in the same place relative to container 14, every time an AGV 18 drives into an AGV bay 16. This ensures that a 2D gantry with end of arm tool can reliably load trays into AGV 18, as described further below.

PRS 100 may be utilized in a variety of package transportation processes. One such process is illustrated generally in FIG. 3, and described in further detail elsewhere herein. In step S300, a parcel carrier's delivery driver visits the PRS for delivery of one or more packages to recipients located within an area serviced by PRS 100; packages are deposited into portal 10, via interaction with computer interface 12. In step S310, PRS 100 stores the deposited packages in internal shelving within PRS 100. A number of parcels may be deposited by a delivery driver for temporary storage in PRS 100. Meanwhile, the delivery driver may also request pickup of a package already stored in PRS 100 (step S320), at which point PRS 100 may deliver the appropriate package from internal storage to presentation for removal at portal 10 (step S325).

For final delivery to their intended recipients, parcels stored within PRS 100 are loaded onto an AGV 18 (step S330). AGV 18 may then attend to automated delivery of packages to recipients, and/or pickup of packages being shipped out by shippers within an area serviced by the AGV (step S340). AGV 18 may then return to PRS 100 (step S350), and parcels within the AGV (such as undelivered parcels or shipments tendered to AGV 18 by individuals interacting with AGV 18 during its remote navigation) may be unloaded into PRS 100 for storage, subsequent redelivery and/or tendering to a parcel delivery driver (step S360).

Figure 4:
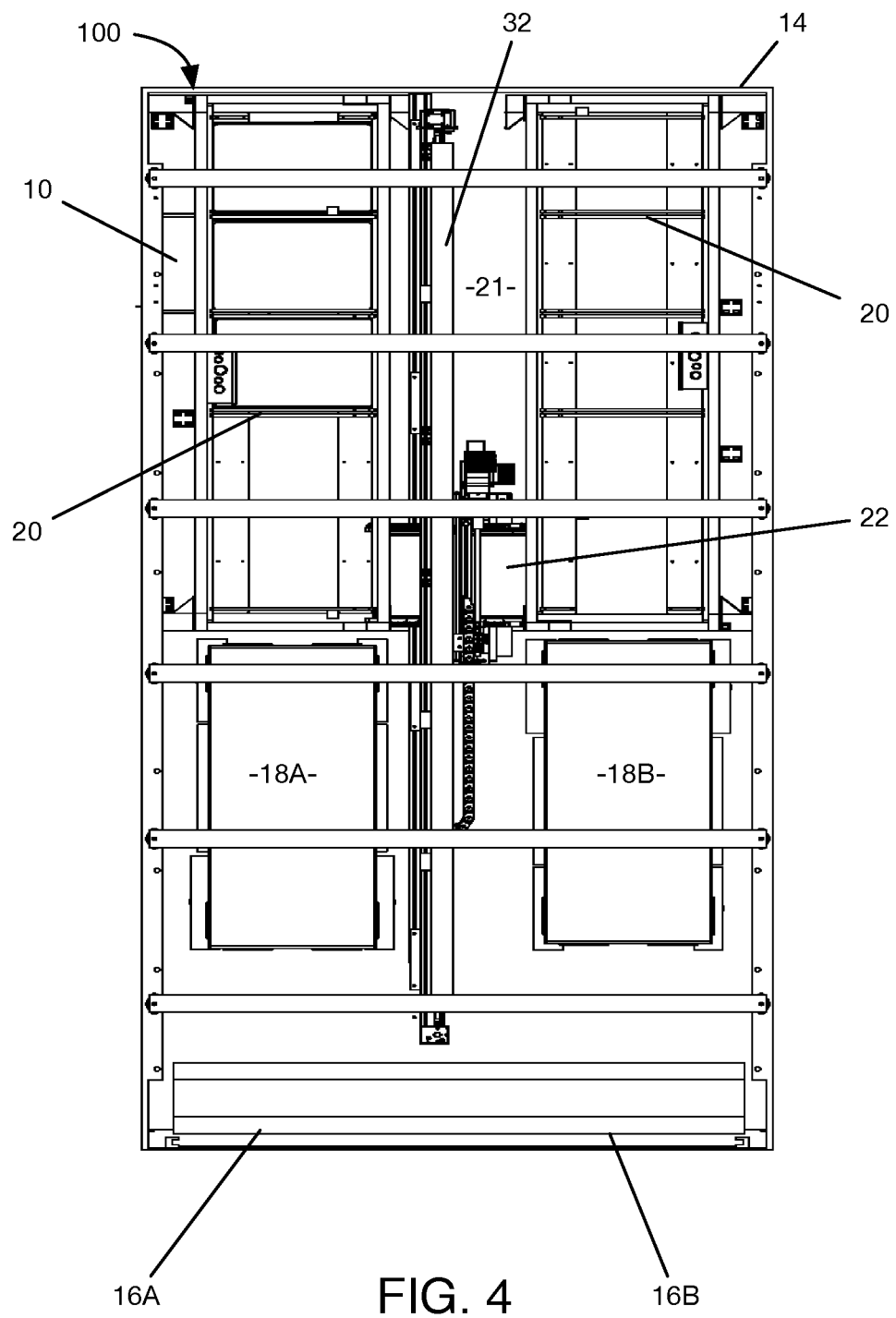
FIG. 4 is a top plan view of a PRS with top container wall removed.

FIG. 4 is a top plan view of PRS 100, with container top surface 14A removed to reveal structures inside. AGV 18A is docked within left bay 16A; AGV 18B is docked within right bay 16B. As seen in FIG. 4, the receiving station design is generally symmetric with structures arranged along either side of a centerline, promoting maximization of storage space and equipment reuse. A two-dimensional gantry 32 includes an end of arm tool 22, and is installed parallel to and generally along the centerline of PRS 100 within an open central corridor 21. Gantry 32 (carrying tool 22) can thereby move in two dimensions though the centerline of container 14 to access: shelving 20 installed along both sides of the container, the delivery driver portal 10 (illustrated here on the PRS left side, but which may be installed on either side or on both sides) and at least one side of each of AGVs 18A and 18B, docked within bays 16A and 16B respectively on either side of PRS 100. The end of arm tool 22 can preferably interface with all these different components as if it was interfacing with any standard shelf. The AGVs, shelves and portal may be implemented in such a way as to be functionally identical in the way that they interface with 2D gantry 32 and end of arm tool 22.

In order to optimize package handling, parcels may be effectively containerized on standardized carrying trays, from the point of package loading (or unloading) via portal 10, until the point of delivery by an AGV (or pickup by an AGV). Such an approach may increase the reliability of package handling and reduce the complexity of equipment required within PRS 100 for package handling, as end of arm tool 22 need only interface with a single uniform package tray structure, rather than attempting to handle packages directly having a variety of shapes, weights and sizes.

The 2D gantry 32 and end of arm tool 22 may use symmetric motions to move a tray with a package on top of it from the package portal 10 to any number of storage shelves 20 and then finally into a shelf on AGV 18. These symmetric motions can move trays between three positions: extended towards one side of the PRS, extended towards the other side of the PRS, or centered for transport within central corridor 21 between a source location and destination location appropriate for a given package. In connection with movement between these positions, end of arm tool 22 may also selectively engage and disengage from a tray, as described in further detail below.

Figure 5:
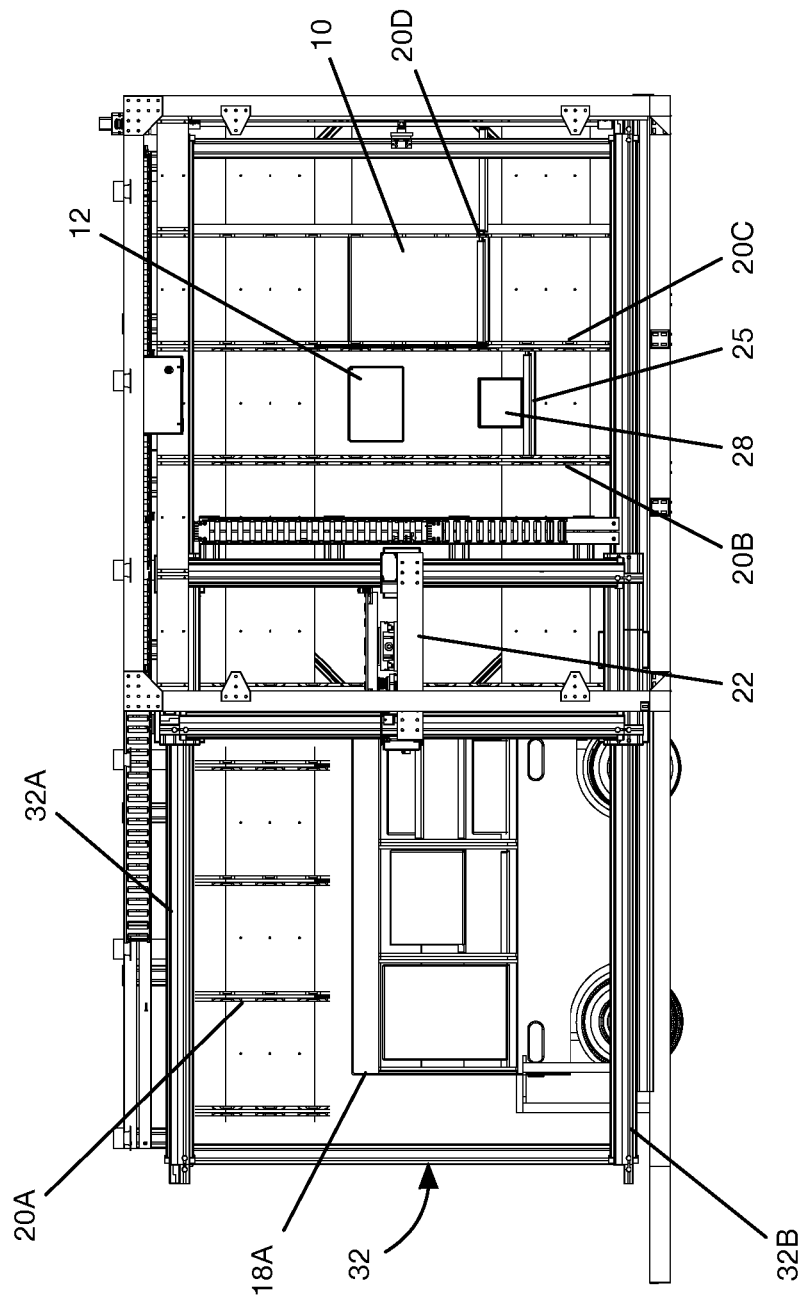
FIG. 5 is a side elevation of a PRS with side container wall removed.

FIG. 5 is a right side elevation of the PRS 100 configuration shown in FIG. 4, with container surface 14C removed to expose internal structures. The right side AGV 18B is also removed, to better illustrate the arrangement of gantry 32 relative to an AGV 18A. Gantry 32 includes upper rail 32A near the top of container 14, and lower rail 32B near the bottom of container 14. Rails 32A and 32B extend horizontally for substantially the length of container 14. Rails 32A and 32B are thereby positioned to allow a maximum range of travel of end of arm tool 22 throughout container 14, maximizing the area available for shelving 20 (and therefore, the package storage capacity of PRS 100). For example, shelving posts 20A may be provided above the height of AGV 18, within a portion of PRS 100 in which AGVs may travel, thereby allowing storage of packages above AGV 18 within container 14. To the extent that packages are moved within PRS 100 on standard package trays, shelving 20 may be formed from posts having a number of slots along their length for engagement of package trays at varying elevations. For example, edges of package tray 25 are engaged with storage shelving rails 20B and 20C to store package 28.

While further details of AGV are described below, AGVs may include internal shelving for storage of packages during transport. On one side, facing the centerline of PRS 100 when AGV 18 is positioned within bay 16, a roll-up door may be opened to expose the AGV's internal storage shelving. Preferably the AGV storage shelving will have a similar construction to stationary PRS shelving 20, such that gantry 32 and end of arm tool 22 can operate to move a package tray 25 (and a package resting thereon) from PRS shelving 20 (or directly from driver portal 10) into an AGV 18 (e.g. in step S230). For example, AGV 18A includes roll up door (illustrated in a retracted position in FIG. 5) positioned on a side of AGV 18A facing the centerline of PRS 100 (and thus facing gantry 32). Use of a roll up door in such an application allows a low profile that not only maximizes storage space within the AGV and above the AGV, but also reduces the overall footprint required for PRS 100, as PRS 100 need not accommodate clearance for opening of swinging doors on AGVs 18A and 18B.

Figure 3:
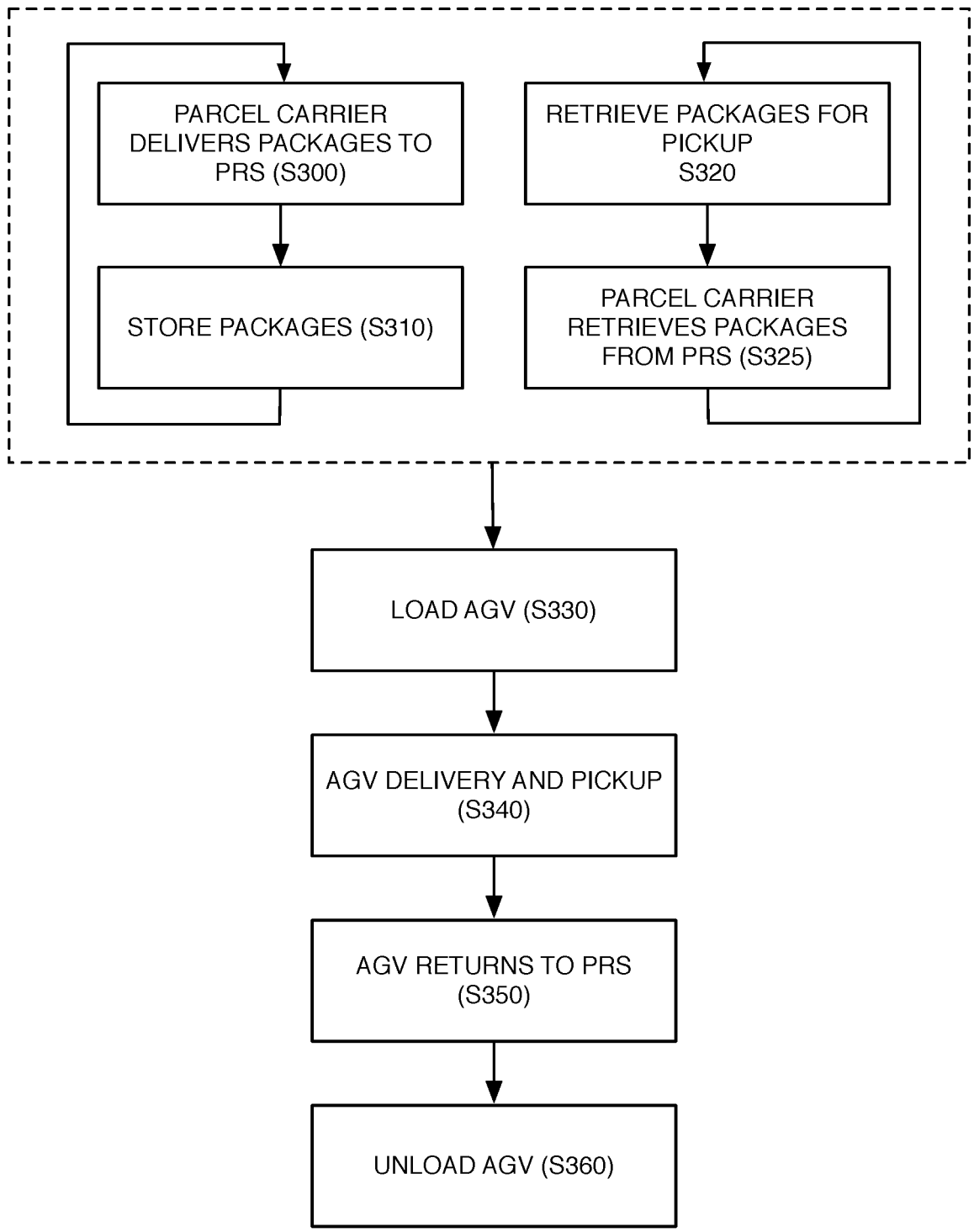
FIG. 3 is a process for parcel pickup and delivery using a PRS.

The PRS structure illustrated in FIGS. 4 and 5 may thus be utilized to implement, e.g., steps S300-S330 and S360 in the process of FIG. 3. For example, in step S300, end of arm tool 22 may deliver a package tray 25 for insertion into shelving receptacles aligned with the bottom edge of driver delivery portal 10. After a parcel delivery service driver inserts a package into portal 10, end of arm tool 22 may pick up the tray 25, moving the tray into the center position within central corridor 21, at which point gantry 32 moves the tray to a desires storage location within shelving 20, at which time end of arm tool 22 may again extend, to insert edges of tray 25 into shelving rails at the desired storage location (step S310). Likewise, in step S320, when a parcel delivery service driver seeks to receive a package from the PRS, gantry 32 may position end of arm tool 22 at a location within shelving 20 at which a tray 25 resides holding the desired package, at which point end of arm tool 22 may retrieve the tray 25, with gantry 32 then moving tray 25 to the location of driver portal 10. At that point, the parcel delivery service driver may open portal 10 and retrieve the package from tray 25. Similarly, for loading of an AGV in step S330, gantry 32 may move tool 22 to a position within shelving 20 containing a tray 25 holding a package desired for loading into AGV 18; tool 22 may retrieve the tray 25 and move it into a center position within corridor 21, at which time gantry 32 moves tray 25 and the package residing thereon to a location proximate an open shelf space in AGV 18, and end of arm tool 22 moves tray 25 and its associated package into AGV 18. Unloading of AGV 18 in step S360 may be accomplished similarly, with tool 22 removing a tray 25 and an associated package from AGV 18, gantry 32 moving the tray 25 to a desired storage location within shelving 20, and tool 22 inserting tray 25 into the desired shelving location.

Figure 6:
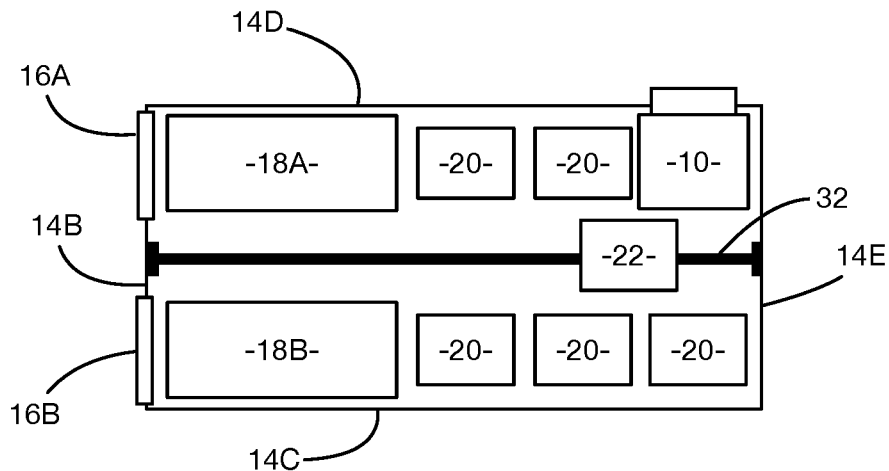
FIG. 6 is a schematic block diagram of a PRS, in accordance with a first configuration.
Figure 7:
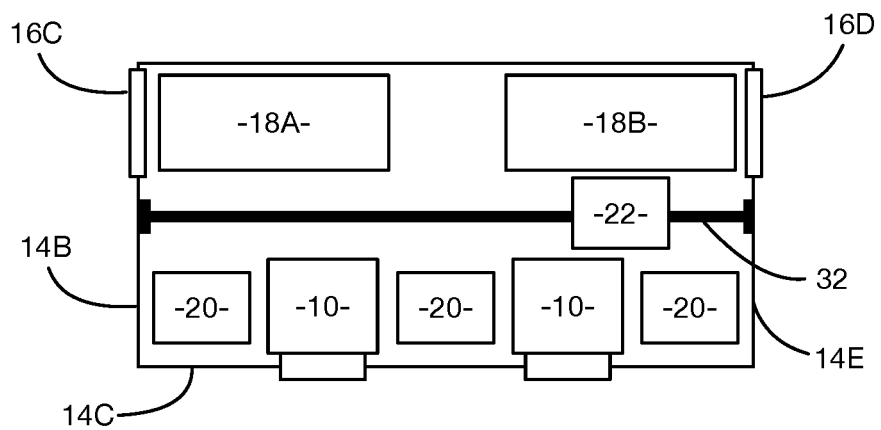
FIG. 7 is a schematic block diagram of a PRS, in accordance with a second configuration.

FIGS. 6 and 7 show alternative PRS configurations in simplified block diagram, with portal 10, shelves 20, gantry 32, end of arm tool 22, AGVs 18 and AGV bays 16. FIG. 6 illustrates the box configuration described in FIGS. 4 and 5, with two AGV entry bays 16A and 16B on a common side 14B of the PRS. However, the AGV locations, shelving, and portals are in large part interchangeable within a PRS, and can be configured to optimize the desired ratio of shelving to AGVs to portals given particular operating conditions. The AGVs can be either first-in-last out (FILO) or first-in-first-out (FIFO) depending on the number of AGVs and the location in which the PRS is installed. However, regardless of configuration, the AGVs, shelving and portals are preferably symmetric about gantry 32. Symmetry of the box may be important to the extent that the most expensive component of PRS 100 may be the linear actuators which make up the 2D gantry 32. In that circumstance, it may be important that the utilization of the linear actuators is maximized by enabling as much of the PRS as possible to be serviced by a single 2D gantry.

FIG. 6 illustrates a PRS configuration where AGVs are in a FILO configuration. Specifically, an AGV may pull into a bay 16A or 16B, and optionally remain in position while other AGVs access other bays. In the event that multiple AGVs pull into a single bay, the first AGV into each bay must wait until a following AGV has been loaded and removed from the bay. This configuration requires clearance on the outside of the PRS on at least two sides. This clearance is needed to enable access to the side of package portal 10 and to allow ground vehicles to exit and enter the PRS via bays 16A and 16B.

FIG. 7 illustrates an alternative, first in first out (FIFO) AGV configuration. and requires clearance on a minimum of three sides on the outside of PRS 100. The configuration makes it easier for AGVs to enter and exit the PRS because an AGV 18 pulls straight into a first bay 16C in container surface 14B, continues driving straight through the PRS to a second AGV position, and exits bay 16D on opposing end 14E. Therefore, AGVs may exit in the order in which they enter. However, the FIFO configuration of FIG. 7 requires clearance on a minimum of three sides of the outside of the PRS: side 14B for AGV entrance, side 14E for AGV exit, and side 14C for one or more driver portals 10.

Figure 8:
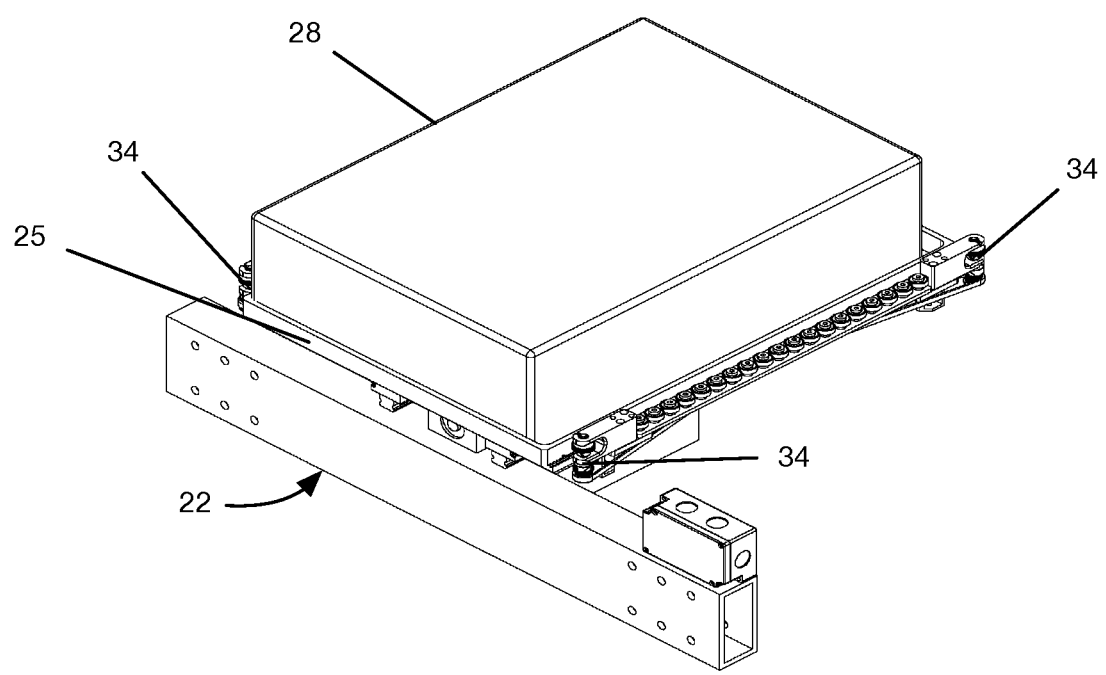
FIG. 8 is a perspective view of end of arm tool with box.

FIG. 8 is an upper perspective view of end of arm tool 22, with a tray 25 and package 28 loaded thereon. As described above, end of arm tool 22 is used to pull out and push in package trays 25 in a motion perpendicular to the motion of the 2D gantry 32. The end of arm tool is symmetric such that tray can be push onto or pulled off a shelf on either side of the 2D gantry. Packages of various sizes 28 are placed on a standardized tray 25. In some embodiments, the standard tray 25 may include a gear rack along the side of the tray. The racks mounted to the tray 25 may then be grabbed by pinion gears 34 at each corner of the end of arm tool 22. These pinion gears 34 grip the gear rack and move the tray back and forth perpendicular to the motion of the 2D gantry. The end of arm tool 22 also has rails (described further below) which allow the tray to slide smoothly along the end of arm tool 22 perpendicular to the motion of the 2D gantry 34.

Figure 9A:
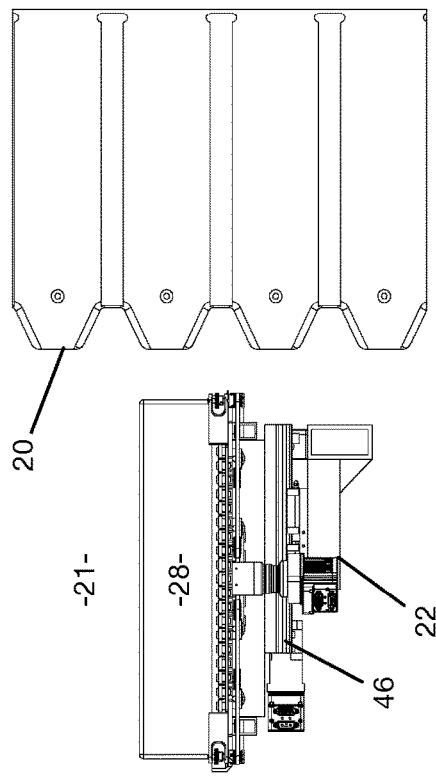
FIGS. 9A, 9B, 9C and 9D are progressive side views of end of arm tool motion sequence used to load and unload tray from shelf, portal or AGV.
Figure 9C:
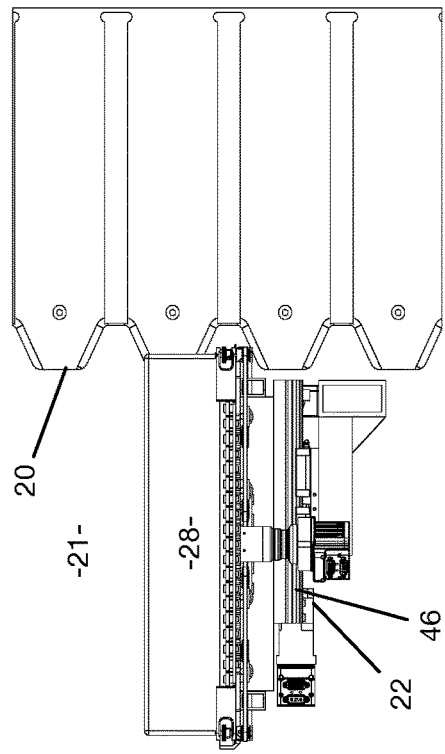
Figure 9B:
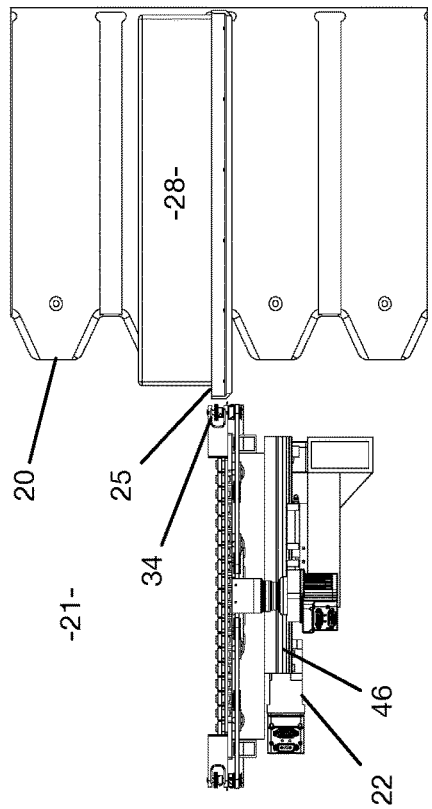
Figure 9D:
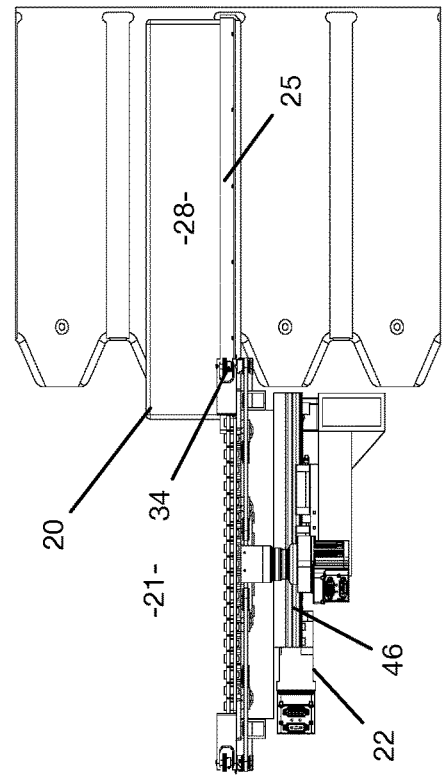

FIGS. 9A-9D illustrate the motion that allows end of arm tool 22 (e.g. using pinion gears 34) to engage with tray 25 (e.g. rack portions), while tray 25 is supporting package 28, thereby moving package 28 on to gantry 32 for transport. In FIG. 9A, end of arm tool 22 starts in a position such that the 2D gantry 32 (not shown in FIGS. 9A-9D) is free to translate up/down and left/right along a central corridor 21 within PRS 100, clearing the front of shelving 20. Once the 2D gantry 32 has moved the end of arm tool 22 into position in front of a tray to be retrieved, then a linear actuator 46 can move the pinion gears 34 that are proximate the tray, forward or backward such that pinion gears 34 can engage with the racks mounted on tray 25 (FIG. 9B). When the rack and pinion are engaged, end of arm tool 22 can pull tray 25 onto the end of arm tool 22, as illustrated in FIG. 9C. Finally, the linear actuator 46 can pull the end of arm tool 22 back into the position seen in FIG. 9D such that end of arm tool 22 is clear of shelf 20 and 2D gantry 34 is free to translate within central corridor 21. This same sequence occurs in the opposite direction to allow the end of arm tool 22 to push tray 25 onto a shelf, whether that shelf is within the PRS stationary storage area 20, at portal 10, or on an AGV 18. Analogous sequences of motion may be implemented in embodiments utilizing friction rollers to engage with trays, as described further below.

Figure 10:
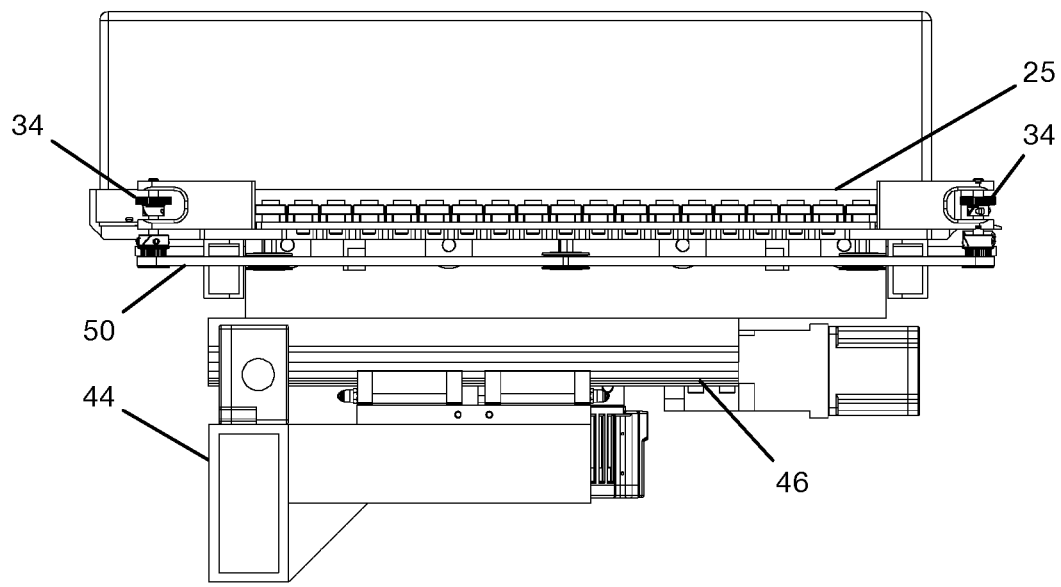
FIG. 10 is a detailed side view of an end of arm tool.

FIG. 10 is the side view of the end of arm tool 22. The standard tray 25 slides on rail 48 (FIG. 11) and is gripped on two sides by pinion gears 34. The end of arm tool 22 is mounted onto the 2D gantry 34 using mounting point 44. Linear actuator 46 enables portions of end of arm tool 22 (including pinion gears 34) to move back and forth to grip a tray and pull it onto end of arm tool 22, or to release a tray and push it out towards a shelf, towards portal 10 or into an AGV. Drive belt 50 powers rotation of pinion gears 34.

Figure 11:
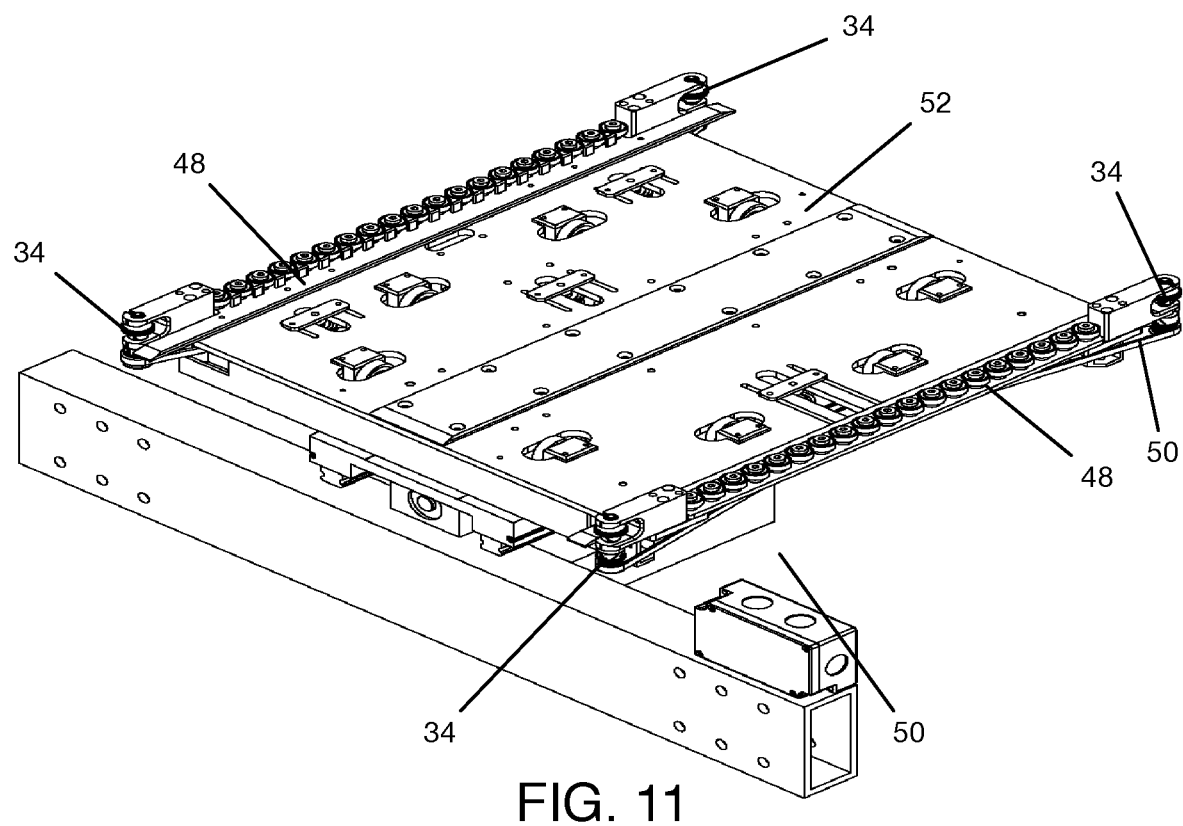
FIG. 11 is a perspective view of end of arm tool without tray or box.

FIG. 11 is an upper perspective view of end of arm tool 22, with no tray engaged. A single steel plate 52 is utilized to locate various components relative to one another, including tray slide rails 48, pinion gears 34, and mounting point 44.

Figure 12:
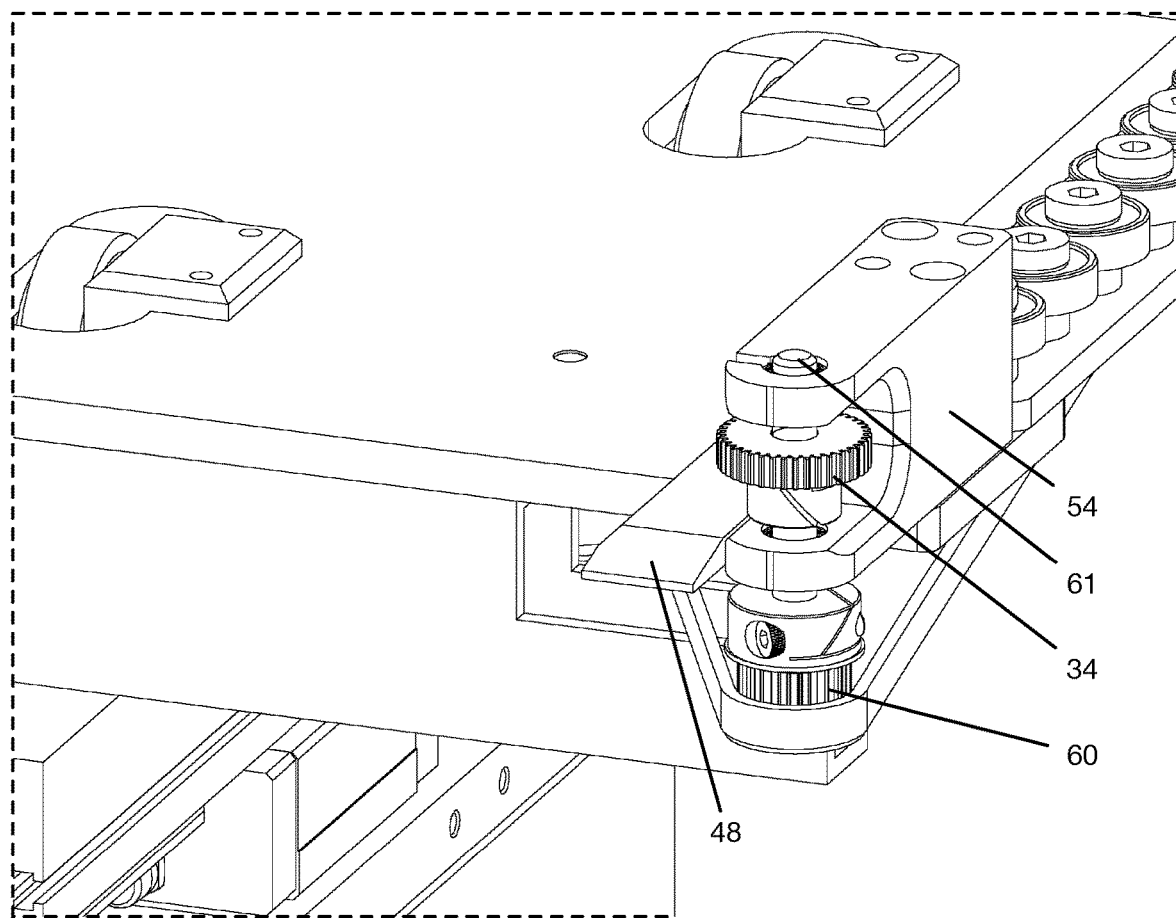
FIG. 12 is a detailed perspective view of tray grabber on an end of arm tool.

FIG. 12 is a close up perspective view of a mechanism for end of arm tool 22 to engage with a package tray, utilizing a pinion gear, bearing block assembly and drive pulley. The pinion gear 34 engages a rack mounted on the side of a tray 25, as pictured in FIG. 13. Limit switches 56 signal when the tray is in position and the pinion gear 34 engages with the rack mounted to the edge of the tray. The pinion gear 34 is driven by a timing belt pulley 60. A shaft 61 is held in place by bearing block 54 and the rail 48 on which the standard tray sits.

In some embodiments, the rack and pinion gear assembly illustrated in, e.g., FIG. 12, can be replaced by a friction roller that grips the sides of a tray with friction to push and pull the tray back and forth. While friction roller embodiments may, in extreme circumstances or event of malfunction, be more susceptible to slippage during a tray loading or unloading operation, use of friction rollers may avoid risk of improper meshing of pinion gears with a tray rack, which may cause equipment damage, accelerated wear, mechanical breakage and/or system malfunction. Slippage provided by friction rollers may, in some circumstances, encourage a tray to align itself during engagement and thus provide more tolerant of misalignment. Thus, in many embodiments, use of friction rollers may be desirable or even preferred.

Figure 13:
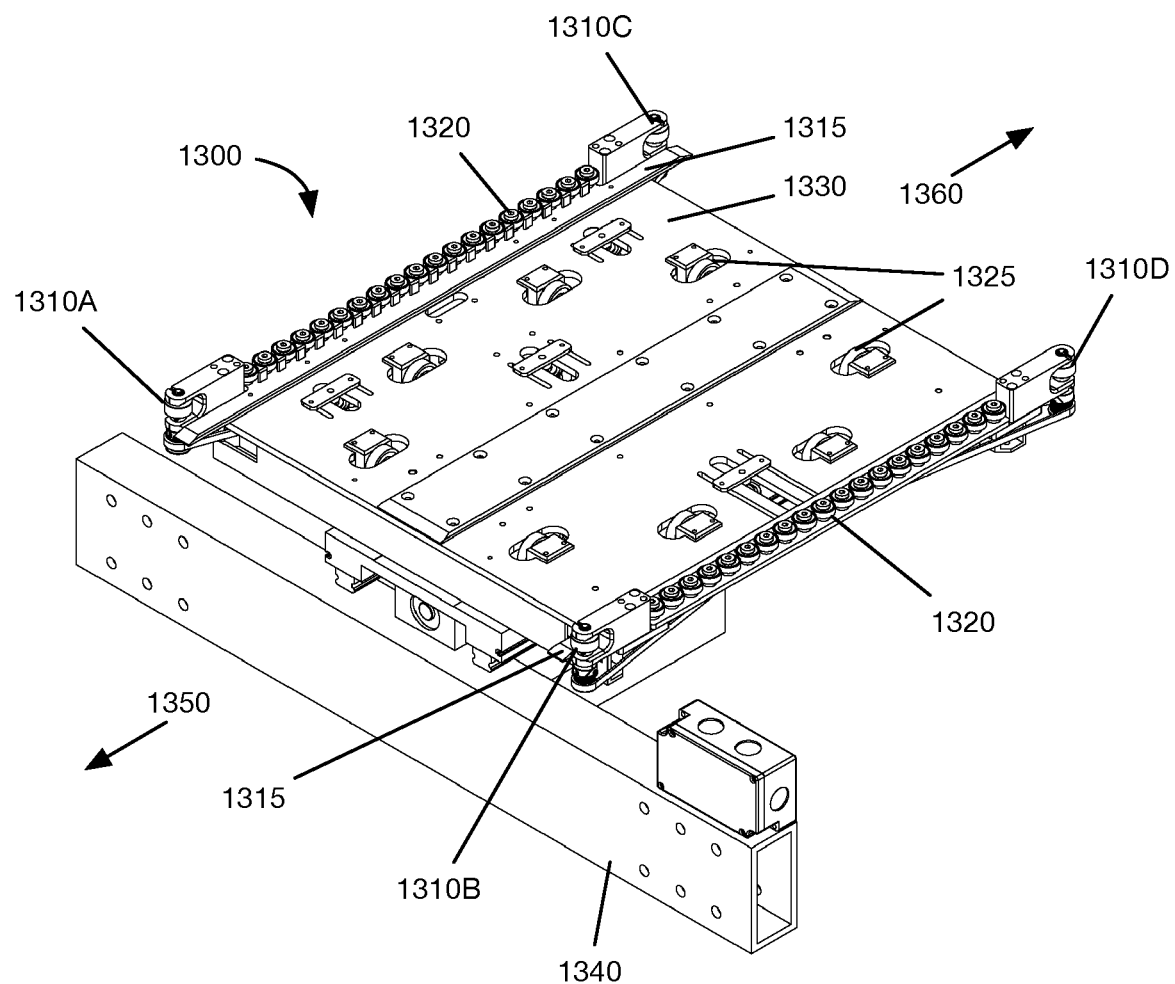
FIG. 13 is a perspective view of an end of arm tool with friction roller-based tray grabbers.
Figure 14:
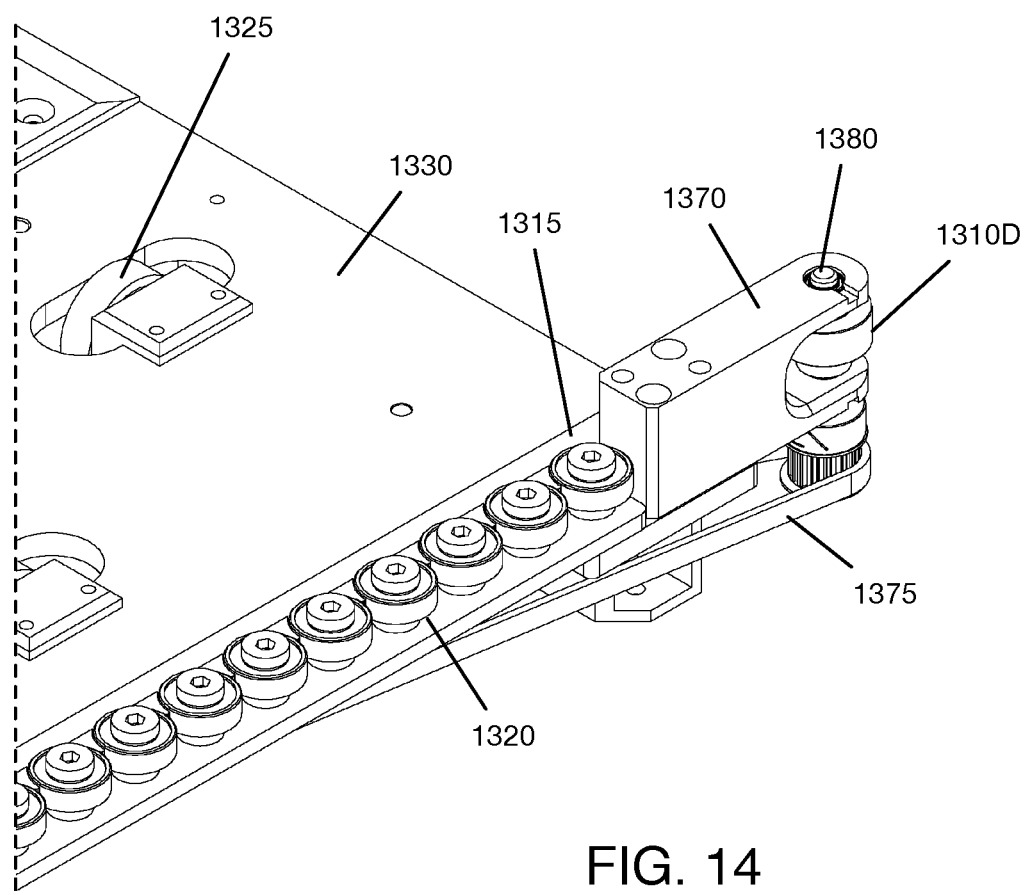
FIG. 14 is a close up perspective view of a friction roller tray grabber.

FIG. 13 illustrates a perspective view of an exemplary end of arm tool 1300 employing a friction roller mechanism to engage and move a tray. Rollers 1310 are positioned at each corner of tool 1300, such that roller 1310A and 1310B may operate to pull or push a tray in direction 1350, while rollers 1310C and 1310D may operate to pull or push a tray in direction 1360. During engagement with tool 1300, trays are supported by rails 1315. Side rollers 1320 facilitate smooth motion of trays onto and off of tool 1300. Multiple base rollers 1325 may be mounted to, and extend slightly above, support plate 1330 in order to further facilitate smooth motion of a tray onto and off of tool 1300. Mounting point 1340 enables mounting of tool 1300 on 2D gantry 32. Similarly to the rack and pinion embodiment described above, a linear actuator (not shown) may operate to advance rollers 1310 towards or away from a package tray, while drive belts may rotate rollers 1310 to push or pull a tray. FIG. 14 is a partial closeup perspective view of friction roller mechanism 1310D. Roller 1310D rotates on shaft 1380 retained in bearing block 1370, and is driven by drive belt 1375.

Rack and pinion or friction roller mechanisms may be beneficially used at least in part because they can be used to make a symmetric end of arm tool that can access both sides of the gantry, thereby maximizing utilization of the costly 2D gantry and reducing the overall cost per package managed by the PRS.

Figure 15:
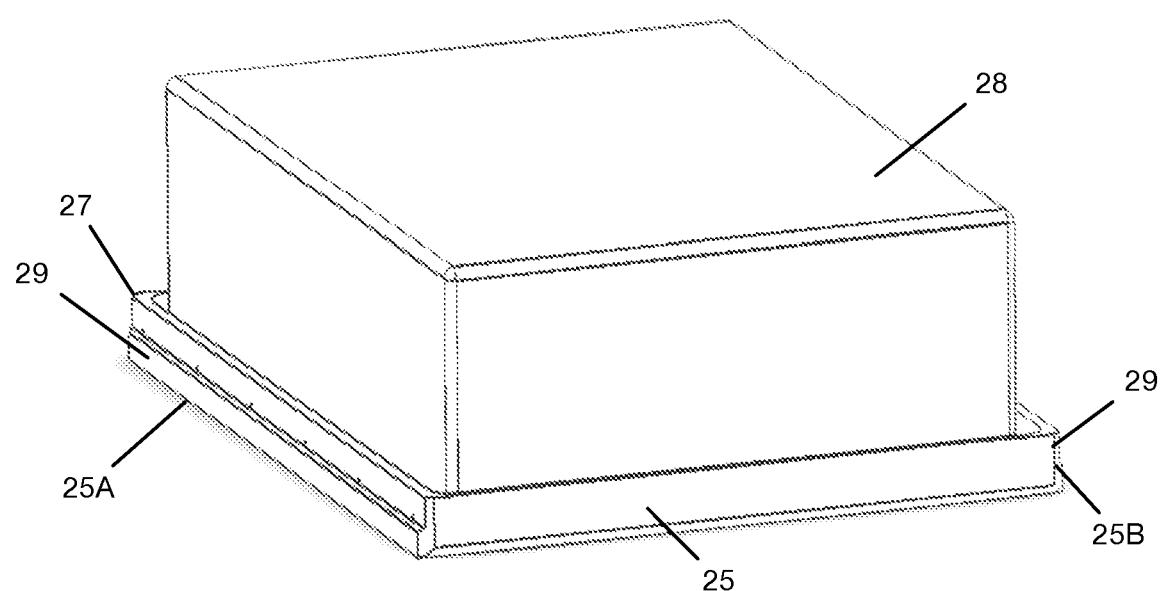
FIG. 15 is a perspective view of a tray with package.

FIG. 15 is an upper perspective view of a tray 25 supporting a typical package 28. Each tray 25 can hold packages of different sizes. The tray has a lip 27 which prevents packages 28 from sliding off tray 25 when moving between package portal 10, tray shelves 20 and AGVs 18. Opposing sides 25A and 25B may include structures to facilitate engagement with an end of arm tool. For example, in rack-and-pinion embodiments of end of arm tool 22, tray 25 may include gear racks 29 on opposing sides 25A and 25B, for engagement with end of arm tool pinion gears 34. In friction roller-based embodiments, tray 25 may optionally include textured coatings or machined surfaces on sides 25A and 25B to increase the strength and reliability of engagement between tray 25 and an end of arm tool such as tool 1300.

While certain embodiments described herein utilize a tray having a relatively flat bottom surface, open above it, for supporting an item being handled, it is contemplated and understood that in other embodiments, a tray may include additional structure for supporting and/or containing items being stored and transported. For example, a tray may form an enclosed or contained area, such as via the inclusion of side surfaces and a top surface. Such closed container-based trays may be particularly beneficial in certain applications, such as transporting collections of loose items. An enclosed tray structure may also be beneficial, for example, in transporting groceries or ready-to-eat food items that may impact a PRS, AGV or other transported parcels through release of aromas, heat or steam. Yet another application is as follows:

Automated Mail or Parcel Delivery

While embodiments described herein may be beneficially employed for delivery of boxes and other packages already contained in easily-handled packaging, additionally or alternatively, embodiments may be effectively utilized for efficient and automated delivery of mail or other types of parcels or items, including items that may be small, loose or otherwise not easily handled. For example, with regard to mail, such use cases may be particularly effective for use with individuals who may not require daily delivery of mail, but who instead may prefer to aggregate postal mail and arrange for delivery at desired times and locations. For example, mail may be delivered to a PRS and stored in the PRS within postal mailbox containers sized for support on a standard tray 25, taking up the space of one small, medium or large parcel.

Figure 16:
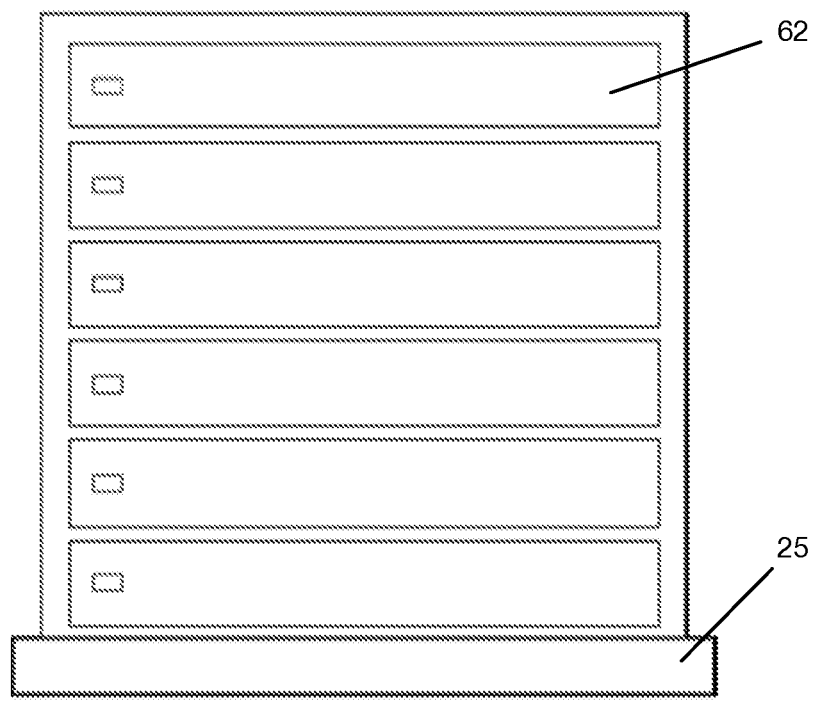
FIG. 16 is a side view of a tray with mail parcel container.

FIG. 16 illustrates a front view of an array of lockers 62 within a container, supported on a parcel tray 25. In some embodiments, array of lockers 62 may be within a single loose container item placed on a tray 25; in other embodiments, array of lockers 62 may be within a container that is integrally attached to tray 25, to form an integrated tray structure that has one or more enclosed compartments. In either circumstance, a person delivering items, such as mail, can load the items into each locker. The array of lockers 62 in a container on a tray can then be loaded into a AGV, similarly to other trays containing parcels as described elsewhere herein, such that the items may be delivered to a recipient's location, within the array of lockers 62, at a time that it is requested by the recipient, similarly to the delivery of packages described above. In particular, a loose array of lockers 62 may be pre-loaded with items for delivery and then deposited into PRS 100 through portal 10 onto a separate tray 25. Likewise, an array of lockers 62 may be previously stored within PRS 100 (potentially as an integrated container-based tray structure), and transported to portal 10 by gantry 32 for loading of items into the lockers by a user through portal 10. Tray 25 and items loaded into array of lockers 62 can then be stored in PRS 100 in a storage shelf 20. When delivery of such items is requested, tray 25 containing array of lockers 62 within a container may be transferred to an AGV 18 for automated delivery to the intended recipient.

AGV Design

Figure 17A:
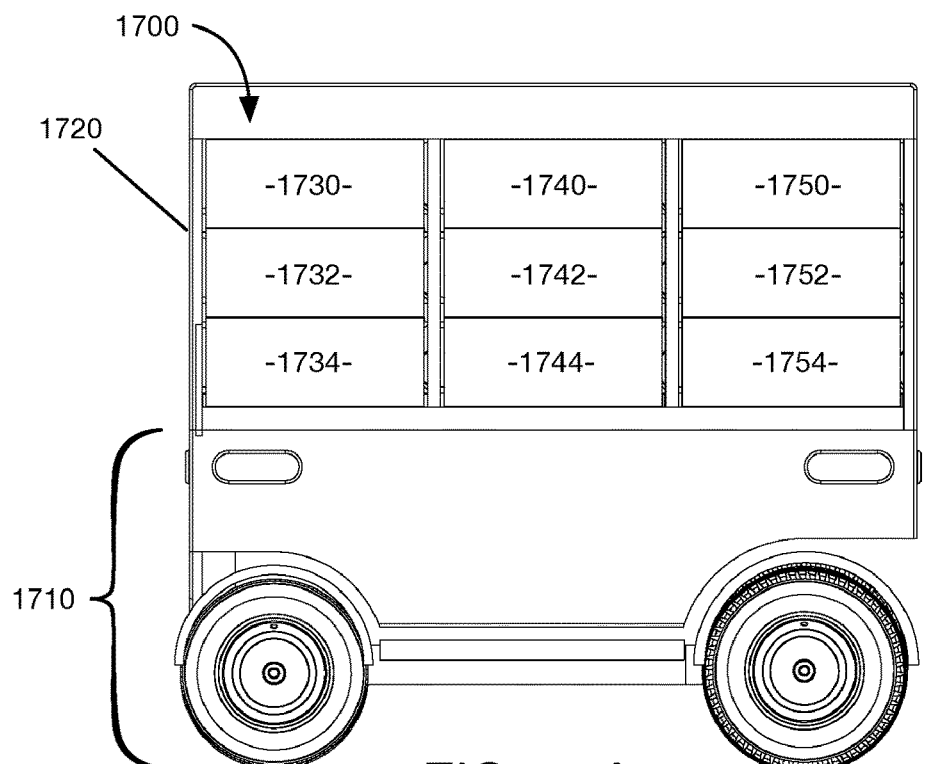
FIG. 17A is a first side view of an AGV for unloading or loading of packages during human delivery or pickup from the AGV.

In some embodiments, an AGV design may be utilized having an array of small lockers for package storage. FIG. 17A shows a detailed side view of such an AGV 18. Package recipients may interact with a first side 1700 of AGV 18. A lower portion 1710 houses the AGV's drivetrain and operating logic, and supports parcel storage compartment 1720. Side 1700 of parcel storage compartment 1720 includes an array of doors 1730, 1732, 1734, 1740, 1742, 1744, 1750, 1752, and 1754. Parcel storage compartment 1720 may be divided into small lockers via placement of trays 25 internally within the compartment, at locations between two adjoining doors in the array of doors.

While AGV 18 is illustrated having a three by three array of doors, it is contemplated and understood that door arrays of differing sizes may be utilized in different embodiments. Other configurations may include an array of 1 by M small doors in a single column, with any number N of columns, thus forming an arbitrary array of M by N small doors. Each door includes an electronically-actuated lock and/or release, controlled by operating logic, to allow package recipients to remove packages from behind select doors upon delivery. Each door can also preferably be automatically opened and securely closed by the AGV without human assistance, which may be critical in many applications as individuals receiving deliveries and inputting a package may not remember to close the locker. Navigation of an AGV with an open locker door may cause safety challenges (e.g. risking hitting passersby or nearby structures with open locker doors), potential damage to the locker doors and AGV, and/or potential risk of loss to the extent transported items fall out of an unsecured access door.

Figure 17B:
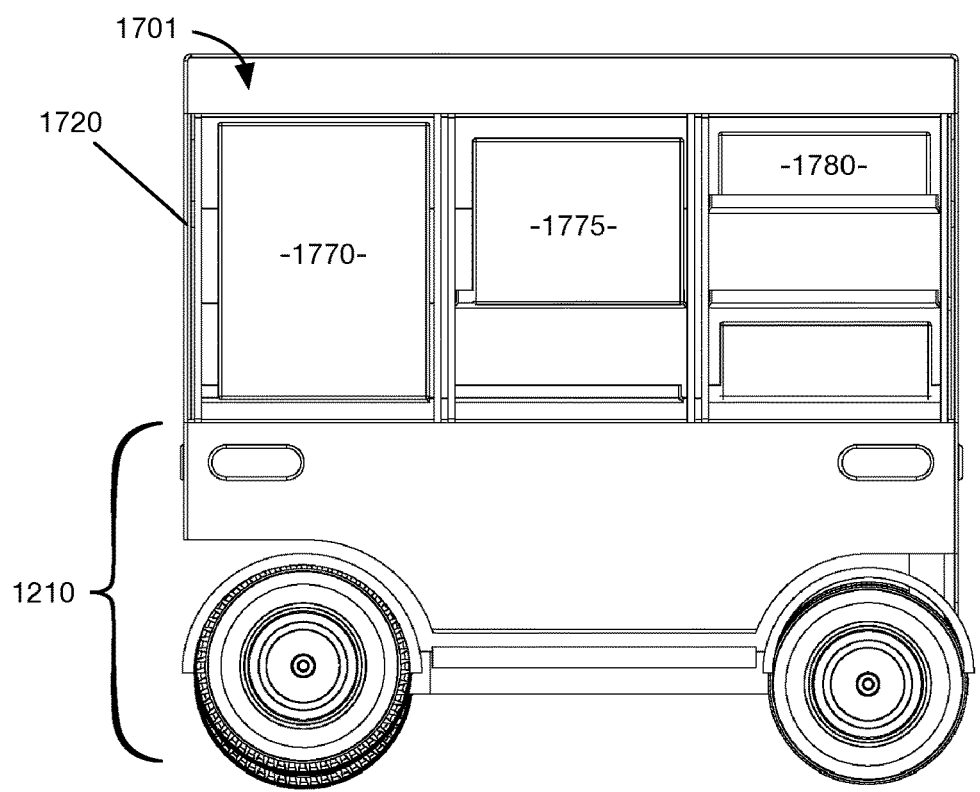
FIG. 17B is an opposite side view of an AGV with rollup door for interaction with a PRS.

FIG. 17B illustrates a side view of a second side 1701 of AGV 18, with an overhead rolling door in an open position to reveal shelving and packages loaded therein. Preferably, package recipients will interact with AGV 18 via side 1700, while a PRS (via a 2D gantry and end of arm tool) will load and unload AGV 18 via opposite side 1701. By separating the sides of AGV 18 with which humans interact and with which machines (i.e. PRS 100) interact, each portion of AGV 18 may be optimized for a specific use case. For example, side 1700 of package compartment 1720 may include stops to prevent trays 25 from sliding outwards or otherwise moving during access by a package recipient. Meanwhile, side 1701 may include tapered shelve guides promoting reliable insertion and removal of trays 25 to or from shelf supports within compartment 1720, at potential locations proximate a lower edge of each access door 1730-1754; thus, even in the event of inaccuracy of positioning of end-of-arm tool 22 within PRS 100, relative to compartment 1720, during loading or unloading. Preferably, the shelving within compartment 1720 is identical in design to shelving 20 within PRS 100, such that no special motions or design considerations of the gantry or the end of arm tool are required when interacting with the AGV.

Multiple doors from amongst doors 1730-1754 may be configured to open simultaneously in different combinations in order to provide recipients with access to packages of different sizes, including packages having a height that exceeds the height of a single door. In such embodiments, AGV side 1700 preferably lacks horizontal divisions between access doors, such that multiple doors may be opened at once to present an opening into package storage compartment 1720 having a height that is a multiple of a single door height. For example, if a large package 1770 is loaded into an end compartment, then during delivery to the package recipient, three doors 1730, 1732 and 1734 may be electronically unlocked for simultaneous opening to allow access to, and easy removal of, the large package 1770. Similarly, when a medium package 1775 is loaded, then two doors 1740 and 1742 may be opened simultaneously during package delivery. Finally, if a small package 1780 is loaded, then a single door corresponding to the package location (in this case, door 1750) may be opened during delivery. Because compartment 1720 is preferably undivided within any given column of package storage locations (with movable trays each supporting a particular package and serving to divide the column into one or more package storage locations), this arrangement allows a high degree of flexibility in the mix of package sizes that may be loaded into a particular AGV. Packages may be limited in width and depth by the size of a locker or associated tray, but with a height limited only by the total height of the array. Such flexibility may be critical, in many application, to maximize utilization of an AGV and achieve optimal unit delivery economics, while allowing handling of a wide variety and varying mix of package sizes.

Figure 18A:
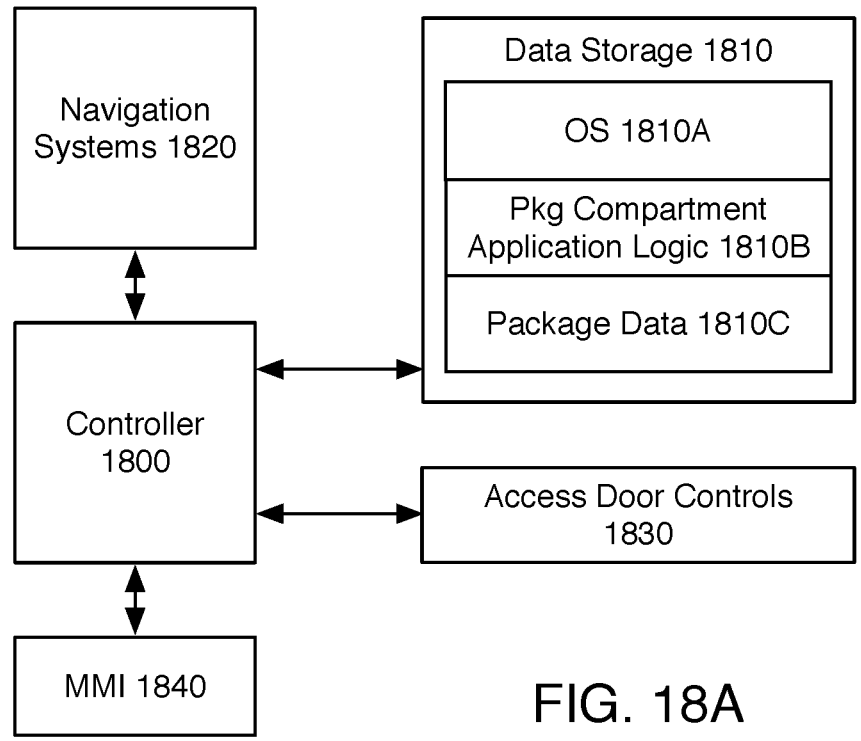
FIG. 18A is a schematic block diagram of AGV control systems.

FIG. 18A is a simplified schematic block diagram of systems that may be utilized to support the above-described operation of AGV 18. Controller 1800 interacts with data storage 1810 to, amongst other things, execute application logic including operating system 1810A, package compartment application logic 1810B, and also to access stored data such as package data 1810C, which may include details concerning packages loaded into AGV 18 (such as, without limitation, package size, intended delivery location, and intended recipient). Navigation systems 1820 enable autonomous navigation of AGV 18 between, e.g., PRS 100 and a package recipient's location. Access door control 1830 enables controller 1800 to, e.g., actuate locks and/or latches for package access doors 1730-1754. A man machine interface (MMI) 1840 may be provided for enabling package recipients to directly interact with AGV 18.

Figure 18B:
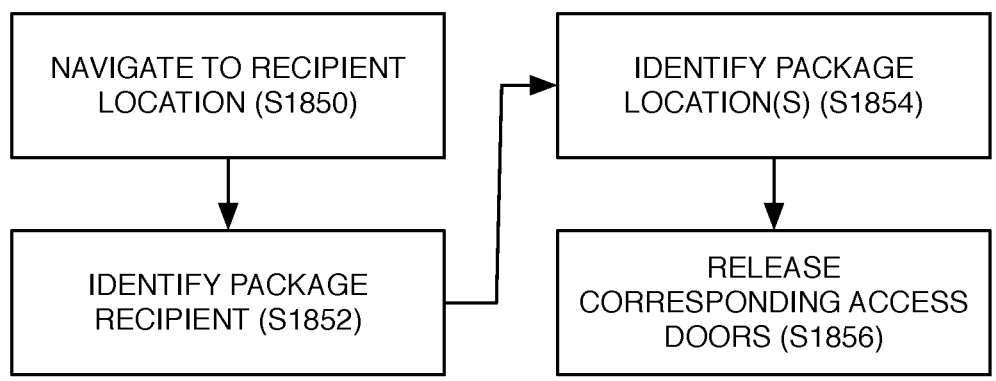
FIG. 18B is a process for delivery of a package by an AGV.

FIG. 18B illustrates an exemplary process for delivery of a package by AGV 18. In step S1850, AGV 18 autonomously navigates, using navigation systems 1820, to a location associated with a recipient designated for a package stored within package storage compartment 1720. In step S1852, AGV 18 identifies the presence of the package recipient, such as through interaction with the recipient via MMI 1840. In step S1854, controller 1800 queries package data 1810C to identify one or more locations within storage compartment 1720 associated with one or more packages designated for delivery to the recipient identified in step S1852. As described above, in the event that the height of a package exceeds the height of a single package access door, multiple contiguous locations may be associated with a single package. Additionally or alternatively, a recipient may have multiple packages located in multiple separate small lockers. In step S1856, controller 1800 interacts with access door controls 1830 to electronically open and close access doors corresponding to locations identified in step S1854, via which a recipient may retrieve one or more packages.

Figure 20:
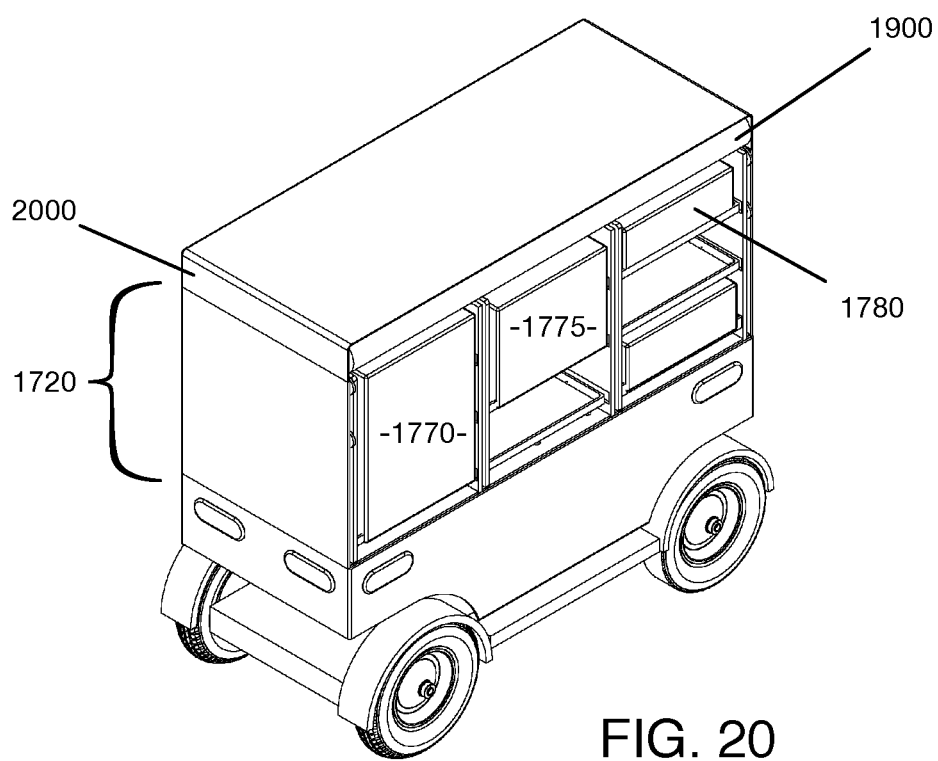
FIG. 20 is an outside perspective of a single automated roll-up door in an open position, for making shelving accessible to an automated gantry and end of arm tool.

In some embodiments, as illustrated in FIGS. 17B and 20, a vertical column of AGV access doors may be without fixed horizontal divisions, such that as much as an entire column of access door spaces may be combined into a single storage compartment depending on placement of movable package support trays. However, it is contemplated and understood that in other embodiments, package storage compartment 1720 may include at least some fixed divisions. However, preferably, at least two contiguous vertically-arranged access doors are provided without horizontal divisions, such that they may be adaptively combined as needed to provide larger or smaller storage areas.

Figure 19:
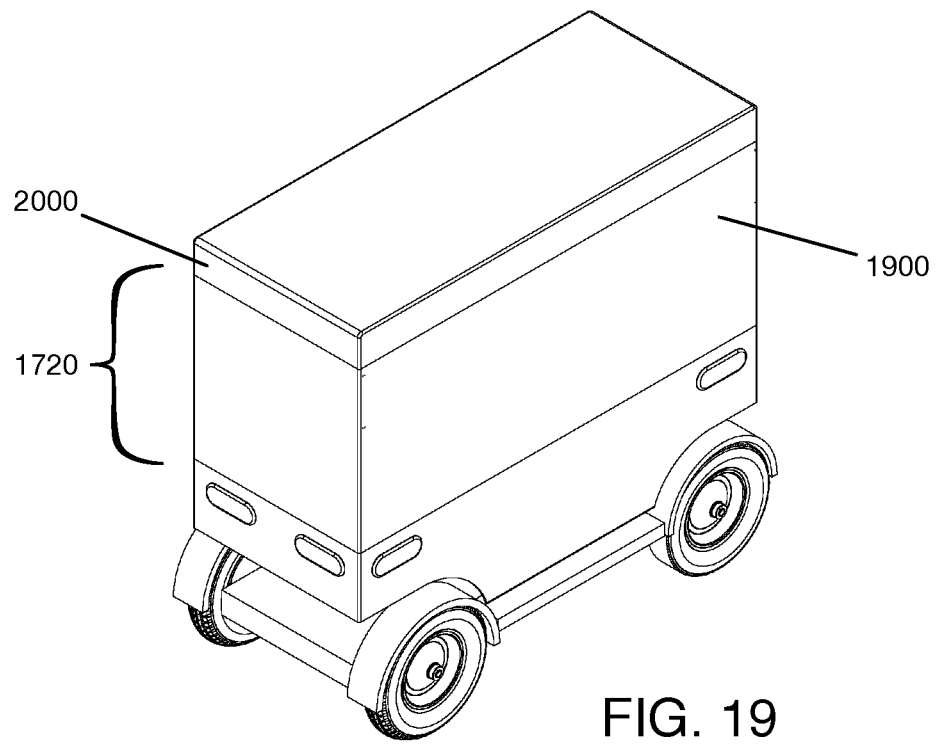
FIG. 19 is an outside perspective of a single automated roll-up door in a closed position.

FIGS. 19 and 20 show a detailed view of a single automated roll-up door providing access to an AGV package storage compartment during loading by a PRS. In FIG. 19, roll up door 1900 is shown in a closed position, to securely store packages within compartment 1720. FIG. 20 shows AGV 18 with roll up door 1900 in an open position, rolled up into AGV top compartment 2000, exposing shelving inside the AGV such that it may be treated by 2D gantry 34 and end of arm tool 22 exactly like stationary shelves 20 inside PRS 100 (e.g. for loading and/or unloading of packages 1800, 1805 and 1810). Roll-up door 1900 thus provides a low profile solution to make the shelving inside the AGV accessible to the PRS.

Use of PRS Portals

Figure 21:
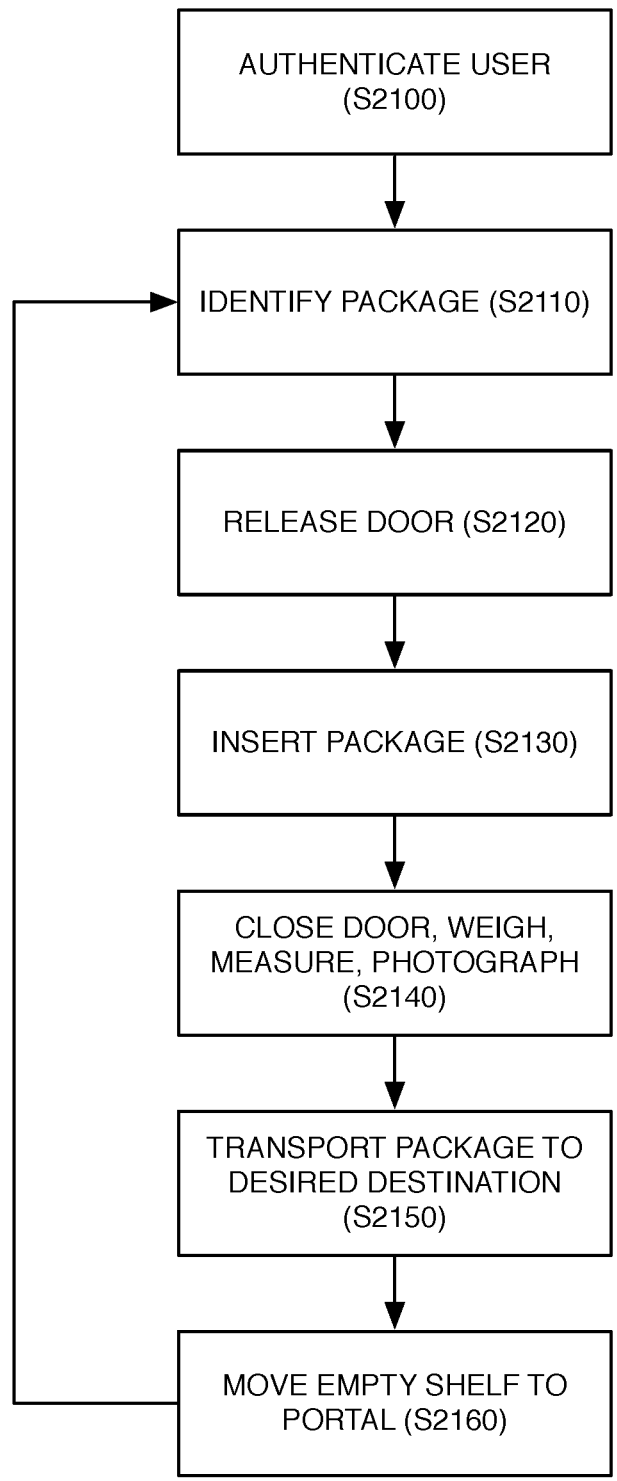
FIG. 21 is a process for operation of a PRS package portal.

As mentioned above, PRS 100 includes one or more portals 10 to enable parcel delivery service drivers to load packages into, or unload packages from, PRS 100. Referring back to FIG. 2, a user may access touch screen computer 12 with integrated camera in order to, for example, identify the user to PRS 100, identify a package to be deposited into PRS 100, and/or identify a package that the user desires to remove from PRS 100. FIG. 21 illustrates an exemplary process for depositing a package into PRS 100, using portal 10. In step S2100, the user authenticates with PRS 100 using computer 12, such as via logging in with username and password, scanning a QR code, or tapping an RFID badge. In step S2110, the user identifies a package to be deposited into PRS 100, e.g., by optically scanning a bar code associated with the package's delivery label. In step S2120, door 11 is released for opening. In step S2130, the user inserts a package 28 through portal 10 onto tray 25. In step S2140, the user closes door 11, and door 11 is locked, at which point the package is preferably weighed (e.g. via a weigh scale integrated into portal tray support 20D (FIG. 5)), measured and photographed. Preferably, the shipping labels are also digitized to confirm package identify. In step S2150, PRS 100 retrieves tray 25, transports tray 25 and the package supported by it through PRS central corridor 21 towards a desired storage destination, and then loads tray 25 and its supported package into the desired destination (such as shelving 20 or directly into the package compartment of an AGV docked within PRS 100). In step S2160, 2D gantry 32 and end of arm tool 22 position an empty tray 25 into a portal tray support 20D at a level aligned with a lower edge of portal 10, such that portal 10 is ready for loading of another package. Preferably, for safety, door 11 remains locked at all times when trays are moving in and out of portal 10.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

The invention claimed is:

1. A package receiving and delivery system comprising:
   a two-dimensional gantry oriented along a central corridor of a pickup and receiving station (PRS);
   an end of arm tool supported by the two dimensional gantry, the end of arm tool selectively engaging and disengaging from one or more package support trays, and moving said one or more package support trays between a central position, a position extended in a first direction perpendicularly to the gantry, and a position extended in a second, opposite direction perpendicularly to the gantry;
   an access portal for receiving one or more packages from outside of the PRS, the access portal positioned proximate said gantry such that said end of arm tool may extend one of said trays towards said portal for placement of a package thereon;
   internal shelving rails within the PRS on one or more sides of the central corridor, adapted for engagement and support of said one or more package support trays for storing packages supported thereon; and
   one or more bays for passage of an automated ground vehicle (AGV) into the PRS on one or more sides of the central corridor, the bays accessible to the gantry and end of arm tool for loading and unloading of package support trays into an AGV.

2. The system of claim 1, in which the end of arm tool comprises one or more pinion gears for engaging with, and disengaging from, one or more gear racks on said package support trays.

3. The system of claim 1, in which the end of arm tool comprises one or more friction rollers for engaging and disengaging with said package support trays.

4. The system of claim 1, in which said access portal comprises: a computer interface accessible from outside the PRS; and an electronically-releasable portal door.

5. The system of claim 4, in which said access portal further comprises: a tray support within the PRS proximate a lower edge of said portal door, into which the gantry and end of arm tool may insert a package support tray; whereby an individual using the access portal may deposit a package directly onto the package support tray.

6. The system of claim 5, in which the tray support comprises a weigh scale.

7. The system of claim 1, wherein at least some of said package support trays comprise a flat bottom surface.

8. The system of claim 1, wherein at least one of said package support trays comprises an array of containers.

9. The system of claim 8, in which the array of containers comprises an array of mailboxes.

10. The system of claim 1, in which said one or more bays open to a first external surface of the PRS; and in which said access portal is positioned in a second external surface of the PRS; wherein the first external surface and the second external surface are adjacent to one another.

11. The system of claim 1, further comprising an AGV within one of said bays, the AGV comprising a package storage compartment containing one or more shelving rails adapted for insertion of said one or more package support trays by said gantry and end of arm tool.

12. The system of claim 11, wherein the AGV package storage compartment comprises a first side for removal of packages by a package recipient, and a second side for insertion of packages by said PRS.

13. The system of claim 12, in which the AGV package storage compartment second side comprises a roll up door.

14. The system of claim 12, in which:
   the AGV package storage compartment first side comprises an array of access doors comprising one or more columns and two or more rows, each access door having an electronically-actuated control for opening and closing said access door; and
   wherein two or more contiguous doors within a common column of the package storage compartment may be opened simultaneously to provide access to a package having a height that exceeds a height of a single access door.

15. A method of delivering a package, comprising:
   receiving a package at a pickup and receiving station (PRS) by depositing said package into a portal in the PRS onto a package support tray;
   storing the package within the PRS by transferring said package support tray from the portal to storage shelving via operation of a two-dimensional gantry with end of arm tool; and
   transferring said package to an automated ground vehicle (AGV) for delivery to a package recipient, by using said two-dimensional gantry with end of arm tool to move the package support tray holding the package from the storage shelving into a package compartment of the AGV.

16. The method of claim 15, in which the step of storing the package within the PRS comprises:
   using said end of arm tool to engage the package support tray and move the package support tray into a PRS central corridor in which the two-dimensional gantry is positioned;
   translating the package support tray within the central corridor using the two-dimensional gantry; and
   pushing the package support tray into a destination storage shelving location via operation of the end of arm tool.

17. The method of claim 15, in which the step of transferring said package to an AGV comprises:
   positioning said AGV within the PRS, wherein the AGV package compartment has an open surface facing the two-dimensional gantry;

using said end of arm tool to engage the package support tray and move the package support tray from said storage shelving into a PRS central corridor in which the two-dimensional gantry is positioned;
translating the package support tray within the central corridor using the two-dimensional gantry; and
pushing the package support tray into the AGV package storage compartment via operation of the end of arm tool.

18. The method of claim 15, in which the step of receiving a package from a package carrier comprises:
identifying the package carrier via interaction with a computer interface accessible from outside the PRS;
identifying the package based on imaging of the package using a camera integrated with the computer interface;
opening a portal door;
inserting the package through the portal onto the package support tray; and
closing the portal door.

19. The method of claim 15, further comprising: delivering the package by autonomously navigating the AGV containing the package support tray with the package, to a location associated with the package recipient.

20. The method of claim 19, further comprising automatically opening one or more exterior package access doors to provide the package recipient with access to a portion of the AGV package compartment containing the package.

\* \* \* \* \*